(12) United States Patent
Sukumar

(10) Patent No.: US 10,894,496 B2
(45) Date of Patent: Jan. 19, 2021

(54) CONTAINER HOLDER INCLUDING RETAINING MEMBERS FOR SECURING A CONTAINER

(71) Applicant: GM Global Technology Operations LLC, Detroit, MI (US)

(72) Inventor: Nithish Sukumar, Karur (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 146 days.

(21) Appl. No.: 16/205,660

(22) Filed: Nov. 30, 2018

(65) Prior Publication Data

US 2020/0171994 A1 Jun. 4, 2020

(51) Int. Cl.
| | | |
|---|---|---|
| *B60N 3/10* | (2006.01) | |
| *B60R 7/04* | (2006.01) | |
| *B60R 7/06* | (2006.01) | |
| *B60R 13/02* | (2006.01) | |

(52) U.S. Cl.
CPC ............. *B60N 3/106* (2013.01); *B60R 7/043* (2013.01); *B60R 7/046* (2013.01); *B60R 7/06* (2013.01); *B60R 13/02* (2013.01); *B60R 2013/0287* (2013.01)

(58) Field of Classification Search
CPC ........... B60N 3/106; B60R 7/043; B60R 7/06; B60R 13/02; B60R 7/046; B60R 2013/0287
USPC ... 296/37.12, 1.08, 146.7, 37.8, 37.13, 37.1, 296/1.07
See application file for complete search history.

(56) References Cited

U.S. PATENT DOCUMENTS

| | | | | |
|---|---|---|---|---|
| 6,758,452 B1* | 7/2004 | Salenbauch | .............. | B60N 3/10 224/926 |
| 8,757,572 B1* | 6/2014 | Starr | ...................... | F16M 13/02 224/556 |
| 2005/0205740 A1* | 9/2005 | Sturt | ...................... | B60N 3/106 248/311.2 |
| 2006/0186283 A1* | 8/2006 | Liu | ........................ | B60N 3/106 248/154 |
| 2010/0090079 A1* | 4/2010 | Choi | ...................... | B60N 3/106 248/311.2 |
| 2016/0304019 A1* | 10/2016 | Dargavell | .............. | B60N 3/106 |

FOREIGN PATENT DOCUMENTS

DE 10355736 A1 6/2005

* cited by examiner

*Primary Examiner* — Jason S Morrow
*Assistant Examiner* — E Turner Hicks

(57) ABSTRACT

A container holder is disclosed and includes an inner body defining an innermost surface, an outer body at least partially surrounding the inner body that is rotatable about an axis of rotation, and one or more retaining members. The retaining members each define a retaining surface and are configured to abut against and exert a clamping force upon the container. The retaining members are each connected to the inner body by a hinged connection and are configured to actuate about the hinged connection between a first position where the retaining surface is at a maximum distance when measured from the axis of rotation of the outer body and a second position where the retaining surface is measured at a minimum distance when measured from the axis of rotation of the outer body. The container holder also includes one or more camming members disposed around the outer body.

19 Claims, 3 Drawing Sheets

CONTAINER HOLDER INCLUDING RETAINING MEMBERS FOR SECURING A CONTAINER

INTRODUCTION

The present disclosure relates to a container holder for a vehicle, and more particularly to a container holder including a retaining member for securing a container.

A vehicle typically includes various devices and features for providing comfort and convenience to the driver and passengers. For example, a beverage or container holder may be provided within the interior cabin of the vehicle. The beverage container secures containers such as bottles, cans, travel mugs, and disposable cups.

Many container holders typically include an opening or cavity that is shaped to only secure cups and bottles of a particular size or circumference without excessive movement. In other words, many container holders are not able to accommodate beverage containers of different sizes. Therefore, relatively smaller beverage containers placed within the container holder may fall over and spill liquid as the vehicle is being driven down a street. The smaller beverage container may also move within the container holder as the vehicle is being driven, which in turn creates rattling or other noises. Also, if the container holder is located within a passenger door, then smaller beverage containers may fall over and spill liquid or rattle when the passenger door is opened or closed suddenly. All of these incidents may lead to customer dissatisfaction.

Thus, while current container holders achieve their intended purpose, there is a need for a new and improved system and method for securing containers within a container holder.

SUMMARY

According to several aspects, a container holder is disclosed. The container holder includes an inner body defining an innermost surface shaped to receive a container and an outer body at least partially surrounding the inner body and rotatable about an axis of rotation. The container also includes one or more retaining members that each define a retaining surface. The retaining members are configured to abut against and exert a clamping force upon the container. The retaining members are each connected to the inner body by a hinged connection and are configured to actuate about the hinged connection between a first position where the retaining surface is at a maximum distance when measured from the axis of rotation of the outer body and a second position where the retaining surface is measured at a minimum distance when measured from the axis of rotation of the outer body. The container holder also includes one or more camming members disposed around the outer body and corresponding to one of the retaining members, where each of the camming members are configured to urge a corresponding retaining member about the hinged connection between the first position and the second position as the outer body rotates about the axis of rotation.

In an aspect of the disclosure, the maximum distance is configured to accommodate a first container and the minimum distance is configured to accommodate a second container, where a diameter of the first container is greater than the diameter of the second container.

In another aspect of the disclosure, each of the retaining members include a follower surface.

In still another aspect of the disclosure, each of the camming members define a camming surface that is configured to contact the follower surface of the corresponding retaining member.

In yet another aspect of the disclosure, the camming surface is an inclined arcuate surface.

In another aspect of the disclosure, the camming surface defines a first height and a second height, where the camming members are disposed around an inner surface of the outer body.

In still another aspect of the disclosure, the first height represents a maximum distance between the camming surface and the inner surface of the outer body and the second height represents a minimum distance between the camming surface and an inner surface of the outer body.

In yet another aspect of the disclosure, the container holder includes one or more biasing members. The biasing members are each connected to one of the retaining members.

In another aspect of the disclosure, each biasing member is configured to exert a biasing force against the inner body.

In still another aspect of the disclosure, the container holder is part of a trim component for a vehicle.

In one aspect of the disclosure, a container holder is disclosed. The container holder includes an inner body defining an innermost surface shaped to receive a container and an outer body at least partially surrounding the inner body and rotatable about an axis of rotation. The container holder also includes one or more retaining members each defining a retaining surface configured to abut against and exert a clamping force upon the container. The retaining members are each connected to the inner body by a hinged connection and are configured to actuate about the hinged connection between a first position where the retaining surface is at a maximum distance when measured from the axis of rotation of the outer body and a second position where the retaining surface is measured at a minimum distance when measured from the axis of rotation of the outer body. The container holder also includes one or more biasing members that each exert a biasing force against the inner body. The biasing members are connected to one of the retaining members. The container holder also includes one or more camming members disposed around the outer body and corresponding to one of the retaining members. Each of the camming members are configured to urge a corresponding retaining member about the hinged connection between the first position and the second position as the outer body rotates about the axis of rotation.

In another aspect of the disclosure, the maximum distance is configured to accommodate a first container and the minimum distance is configured to accommodate a second container, where a diameter of the first container is greater than the diameter of the second container.

In still another aspect of the disclosure, each of the retaining members include a follower surface.

In yet another aspect of the disclosure, each of the camming members define a camming surface configured to contact the follower surface of the corresponding retaining member.

In another aspect of this disclosure, the camming surface is an inclined arcuate surface.

In still another aspect of the disclosure, the camming surface defines a first height and a second height, where the camming members are disposed around an inner surface of the outer body.

In yet another aspect of the disclosure, the first height represents a maximum distance between the camming surface and the inner surface of the outer body and the second height represents a minimum distance between the camming surface and an inner surface of the outer body.

In another aspect of the disclosure, the container holder is part of a trim component for a vehicle.

In another aspect, a container holder for a vehicle is disclosed. The container holder includes a trim component. The trim component includes an inner body defining an innermost surface shaped to receive a container and an outer body at least partially surrounding the inner body and rotatable about an axis of rotation. The trim component also includes one or more retaining members each defining a retaining surface configured to abut against and exert a clamping force upon the container. The retaining members are each connected to the inner body by a hinged connection and are configured to actuate about the hinged connection between a first position where the retaining surface is at a maximum distance when measured from the axis of rotation of the outer body and a second position where the retaining surface is measured at a minimum distance when measured from the axis of rotation of the outer body. The trim component also includes one or more biasing members that each exert a biasing force against the inner body, where the biasing members are connected to one of the retaining members. The trim component also includes one or more camming members disposed around the outer body and corresponding to one of the retaining members, where each of the camming members are configured to urge a corresponding retaining member about the hinged connection between the first position and the second position as the outer body rotates about the axis of rotation.

In one aspect of the disclosure, the trim components is a door panel, a center console, or an armrest assembly.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
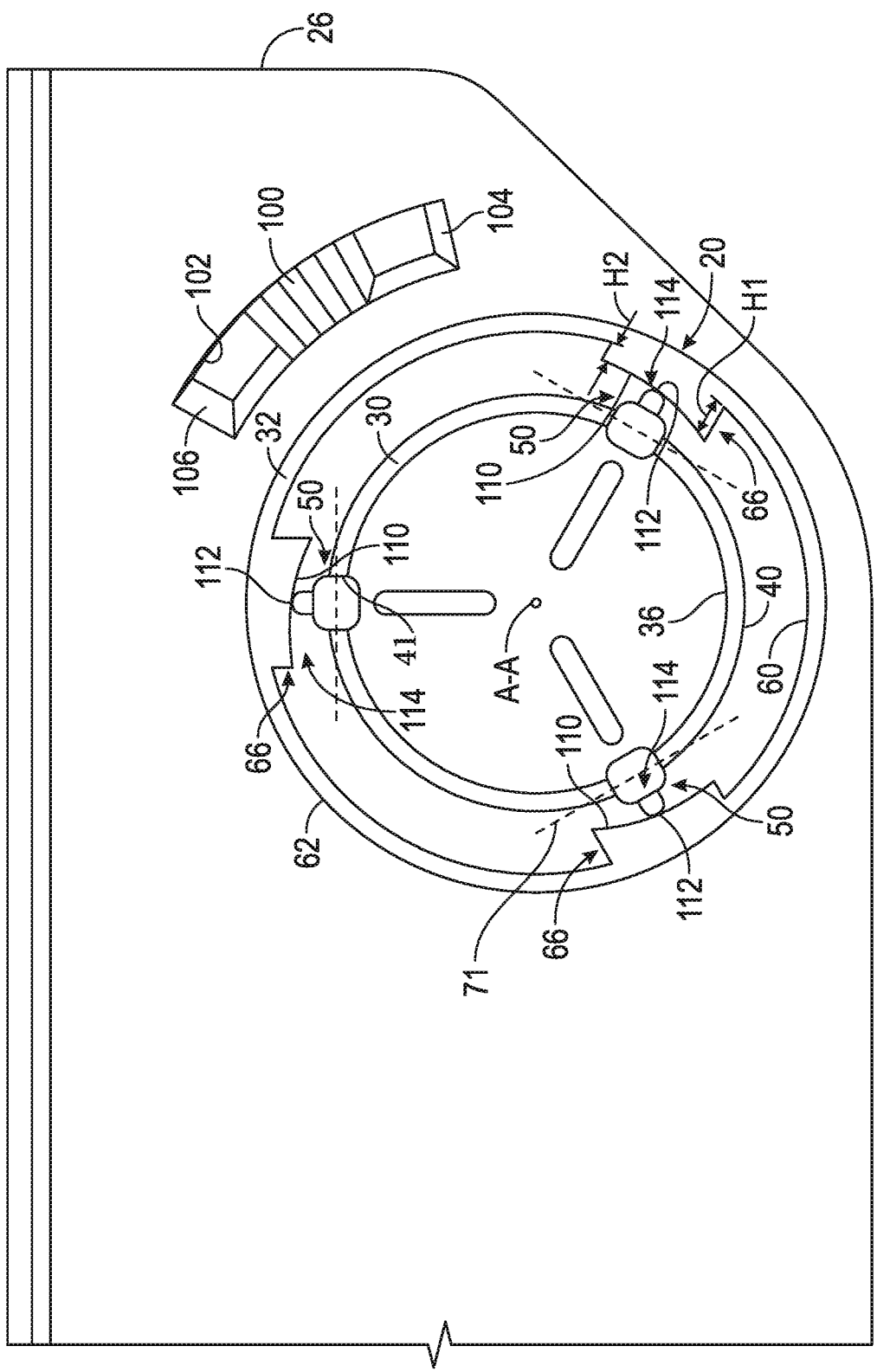
FIG. 1 is a top view schematic view of the disclosed container holder including three retaining members that are spaced equidistantly from one other according to an exemplary embodiment.

FIG. 1 is a schematic illustration of a container holder 20. In an embodiment, container holder 20 is part of a trim component 26 for a vehicle. In an embodiment, the vehicle may be a motor vehicle such as a passenger car, truck, sport utility vehicle, van, or motor home. However, it is to be appreciated that the container holder 20 is not limited to motor vehicles. Instead, the vehicle may be any device for transporting passengers such as, for example, an aircraft. The trim component 26 may be any interior component that is mounted within the vehicle. Some examples of where the trim component 26 include, but are not limited to, a door panel, a center console, or an armrest assembly. Although the container holder 20 is described as being part of a vehicle, it is to be appreciated that the container holder 20 is not limited to vehicular applications.

The container holder 20 is configured to hold a container (the container is shown in cross-section in FIGS. 4 and 5) securely in place without substantial movement. Furthermore, as explained below, the container holder is adjustable to accommodate containers of different sizes or circumferences. In one non-limiting embodiment, the container is a beverage container such as a bottle or can containing water, a carbonated beverage, coffee, or fruit juice. However, it is to be appreciated that the container is not limited to a bottle for containing beverages. Instead, the container may be any vessel such as, but not limited to, travel mugs or disposable cups. Furthermore, the container is not limited to carrying beverages and liquids. Instead, in an embodiment the container may contain solid objects such as, for example, food.

The container holder 20 includes an inner body 30 and an outer body 32 that surrounds at least a portion of the inner body 30. Both the inner body 30 and the outer body 32 may include a substantially cylindrical profile and are arranged concentrically with respect to one another and are both centered about an axis of rotation A-A of the outer body 32. However, it is to be appreciated that the inner body 30 and the outer body 32 are not limited a cylindrical outermost profile. The inner body 30 defines an innermost surface 36 and an outer surface 40. The inner body 30 defines one or more slots 41 that extend from the innermost surface 36 to the outer surface 40. The innermost surface 36 is shaped to receive and secure a bottom portion of a container.

One or more retaining members 50 are disposed within the slots 41 around the inner body 30 of the container holder 20. The retaining members 50 are configured to exert a clamping force upon a container placed within the inner body 30 of the container holder 20. In the embodiment as shown, three retaining members 50 are disposed around a perimeter of the inner body 30 at substantially equal distances from one another, which in turn evenly distributes the clamping force upon the container. Although FIG. 1 illustrates the retaining members 50 spaced equidistant with respect to one another, it is to be appreciated that the container holder 20 is not limited any specific number of retaining members 50.

Figure 2:
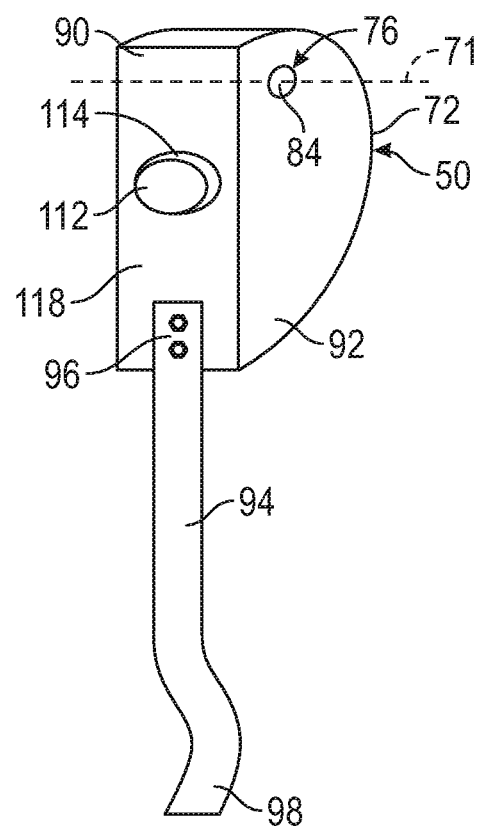
FIG. 2 is a perspective view of one of the retaining members shown in FIG. 1 according to an exemplary embodiment.
Figure 3:
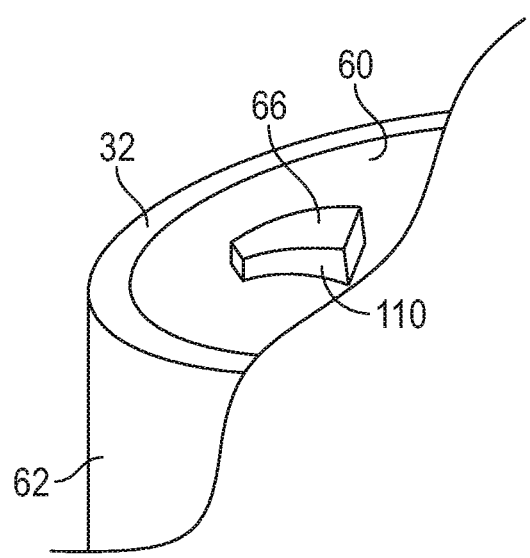
FIG. 3 is a perspective view of an outer body member of the container holder shown in FIG. 1 according to an exemplary embodiment.

The outer body 32 is rotatable about the axis of rotation A-A and defines an inner surface 60 and an outermost surface 62. The inner surface 60 of the outer body 32 is positioned to face at least a portion of the outer surface 40 of the inner body 30. FIG. 2 is a perspective view of one of the retaining members 50, and FIG. 3 is a perspective view of a portion of the outer body 32 (where the inner body 30 is omitted). Referring to both FIGS. 1 and 3, the inner surface 60 of the outer body 32 defines one or more camming members 66 that project in a direction outward and towards the outer surface 40 of the inner body 30 (only one of the camming members 66 are shown in FIG. 3). Each camming member 66 corresponds to one of the retaining members 50. The camming members 66 are each configured to translate the rotatory motion created as the outer body 32 rotates about the axis of rotation A-A into a reciprocating motion of the retaining members 50. As explained below, each of the retaining members 50 reciprocate about their respective axis of rotation 71 (seen in FIG. 2).

Figure 4:
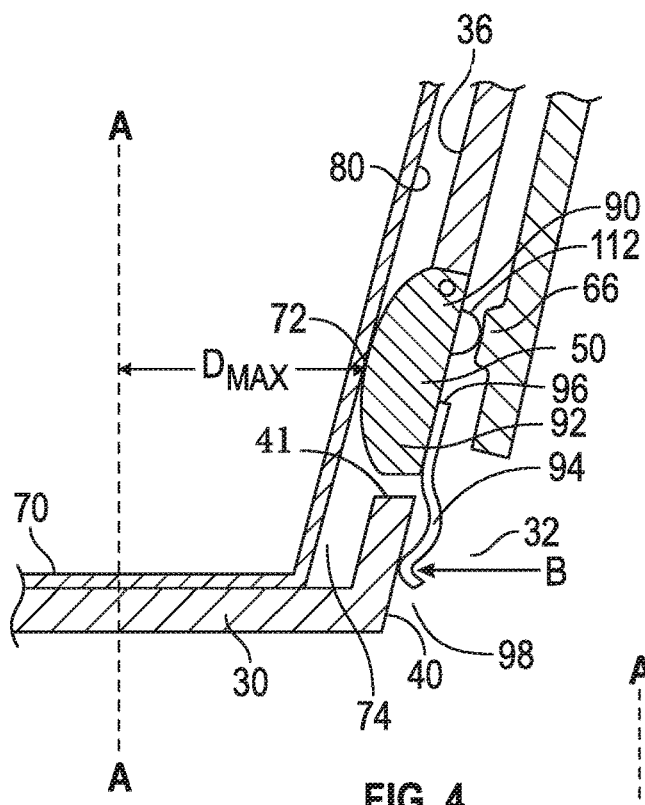
FIG. 4 is a cross-sectioned view of the container holder, where the retaining member is in a first position according to an exemplary embodiment.

FIG. 4 is a cross-sectioned view of the inner body 30, the retaining member 50, and a first container 70 that is placed within a cavity 74 defined by the innermost surface 36 of the inner body 30. The retaining member 50 defines a retaining surface 72, where the retaining surface 72 abuts against an outer surface 80 of the first container 70. The retaining members 50 are each configured to abut against and exert a clamping force upon the first container 70. A distance D is measured between the retaining surface 72 defined by the retaining member 50 and the axis of rotation A-A of the outer body 32. In the embodiment as shown in FIG. 4, the distance D is at a maximum dimension (e.g., $D_{MAX}$) and the retaining member 50 is shown in a first position. The retaining member 50 is configured to translate about the axis of rotation 71 (FIG. 2) between the first position and into a second position, which is seen in FIG. 5.

Figure 5:
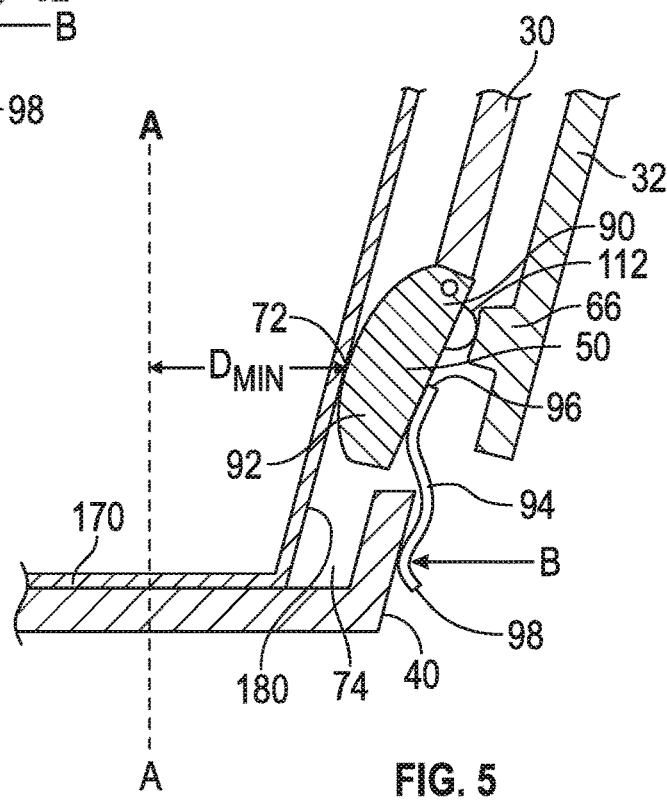
FIG. 5 is a cross-sectioned view of the container holder, where the retaining member is in a second position according to an exemplary embodiment.

In the embodiment as shown in FIG. 5, a second container 170 is now placed within the cavity 74 of the inner body 30. The second container 170 is of a smaller size than the container shown in FIG. 4. In other words, the first container 70 includes a diameter that is greater than the diameter of the second container 170. However, the retaining surface 72 of the retaining member 50 still abuts against and exerts the clamping force upon an outer surface 180 of the second container 170. Accordingly, the distance D between the retaining surface 72 of the retaining member 50 and the axis of rotation A-A and the outer body 32 is at a minimum (e.g., $D_{MIN}$). That is, the retaining member 50 has rotated about the axis of rotation 71 from the first position (seen in FIG. 4) and into a second position. Thus, the minimum distance $D_{MIN}$ seen in FIG. 5 is configured to accommodate a smaller container and the maximum distance $D_{MAX}$ as seen in FIG. 4 is configured to accommodate a larger container.

Referring to FIG. 1, an operator adjusts the distance D between the retaining surface 72 defined by the retaining member 50 and the axis of rotation A-A of the outer body 32 by actuating a slide 100. The slide 100 is connected to the outer body 32 of the container holder 20 (the connection between the slide 100 and the outer body 32 is not visible in the figures). Movement of the slide 100 within its corresponding slot 102 results in rotation of the outer body 32 about the axis of rotation A-A. Specifically, the slide 100 is actuated between a first end stop 104 and a second end stop 106 of the slot 102. When the slide 100 abuts against the first end stop 104, the retaining member 50 is in the first position seen in FIG. 4. The slide 100 may then travel within the slot 102 from the first end stop 104 to the second end stop 106. When the slide 100 abuts against the second end stop 106, the retaining member 50 is now in the second position seen in FIG. 5.

Referring to FIGS. 2, 3, and 4, the retaining members 50 are each connected to the inner body 30 of the container holder 20 by a hinged connection 76 (seen in FIG. 2). The retaining members 50 each include a proximate end portion 90 and a distal end portion 92. The proximate end portion 90 of each retaining member 50 is connected to the inner body 30 of the container holder 20 by the hinged connection 76. In the embodiment as shown, the retaining member 50 is configured to rotate about a hinge pin 84 (FIG. 2), however it is to be appreciated that the hinged connection 76 is not limited to the configuration as shown. For example, in another embodiment the hinged connection 76 may include a living hinge. The retaining members 50 configured to actuate about the hinged connection 76 between the first position where the retaining surface 72 is at the maximum distance $D_{MAX}$ and the second position where the retaining surface 72 is at a minimum distance $D_{MIN}$.

The container holder 20 also includes one or more biasing members 94 that correspond to one of the retaining members 50. Each biasing member 94 is connected to the distal end portion 92 of the retaining member 50. In the embodiment as shown, the biasing member 94 is a leaf spring that is configured to exert a biasing force B against the outer surface 40 of the inner body 30 of the container holder 20. Specifically, the biasing member 94 includes a proximal end portion 96 and a distal end portion 98, where the proximal end portion 96 of the biasing member 94 is connected to the retaining member 50 and the distal end portion 98 of the biasing member 94 is configured to exert the biasing force B upon the inner body 30 of the container holder 20. The biasing force B is configured to reduce or substantially eliminate any excessive or free movement between the corresponding retaining member 50 and the inner body 30, as well as between the retaining member 50 and the respective camming members 66. Although a leaf spring is shown, it is to be appreciated that other biasing members may be used as well. For example, in another embodiment the biasing member is a helical spring or an accordion spring. A torsion spring may also be used at the hinge 76.

Figure 6:
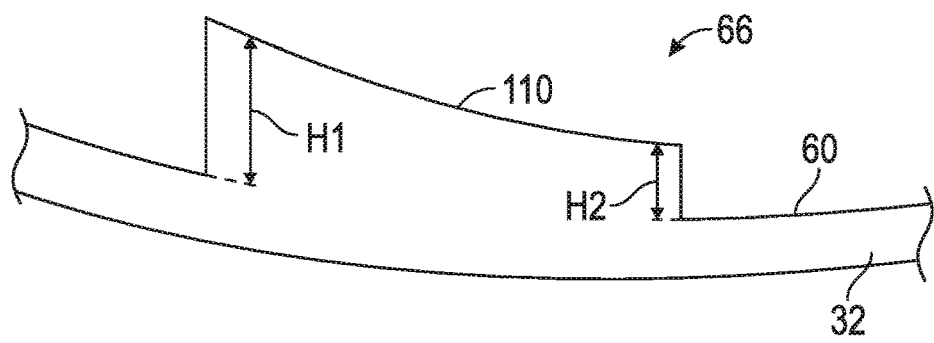
FIG. 6 is an enlarged view of one of the camming members shown in FIG. 1

Referring to FIGS. 1, 2, 3, 4, and 5, the camming members 66 are configured to urge a corresponding retaining member 50 about the hinged connection 76 (FIG. 2) between the first position (FIG. 4) and the second position (FIG. 5) as the outer body 32 rotates about the axis of rotation A-A. Each camming member 66 define a camming surface 110 (seen in FIGS. 1 and 3) that is configured to contact the follower surface 112 (seen in FIGS. 1 and 2) of the corresponding retaining member 50. In the embodiment as shown, the follower surface 112 is part of a protuberance or raised projection 114 that is located along an outer surface 118 of the retaining member 50, and the camming surface 110 is an inclined arcuate surface. FIG. 6 is an enlarged view of one of the camming members 66. The camming surface 110 defines a first height H1 and a second height H2, where first height H1 is greater than the second height H2. Referring to FIGS. 1 and 6, the first height H1 represents a maximum distance between the camming surface 110 and the inner surface 60 of the outer body 32, while the second height H2 represents the minimum distance between the camming surface 110 and the inner surface 60 of the outer body 32.

Referring to FIGS. 1 and 4, when the follower surface 112 of the retaining members 50 abut against the camming surface 110 at the minimum height (e.g., the second height H2) the retaining members 50 are each in the first position. Similarly, when the follower surface 112 of the retaining members 50 abut against the camming surface 110 at the maximum height (e.g., the first height H1) then the retaining members 50 are each positioned in the second position. The follower surface 112 and the retaining surface 72 are located on opposing sides of the retaining member 50.

The clamping force exerted upon the container by the retaining members 50 in either the first position, the second position, or of a number of infinite positions between the first position and the second position is sufficient to retain the container within the container holder 20. More specifically, the clamping force exerted upon the container by the retaining member 50 is sufficient to substantially prevent the container from tipping over, shaking, or creating noises while placed within the container holder 20 during operation of the vehicle (i.e., when the vehicle is driven). Furthermore, it is also appreciated that the clamping force exerted upon the container is sufficient to substantially prevent the container from spilling over or shaking as a passenger door is opened and closed (if the container holder 20 is located within the passenger door).

Referring generally to the figures, technical effects and benefits of the disclosure include a container holder that is configured to secure objects of varying size. More specifically, in an embodiment the container holder includes one or more retaining members that are configured to exert a clamping force upon a container. According, the container holder is configured to engage and secure containers of different sizes. The clamping force exerted upon the container holder is sufficient to secure a beverage container in place to substantially prevent the beverage container from falling over and spilling fluid. The beverage container may also be unable to substantially vibrate within the container holder during operation of the vehicle, which in turn reduces or eliminates rattling and other noise concerns.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A container holder, comprising:
   an inner body defining an innermost surface shaped to receive a container and an outer surface opposite the innermost surface, the inner body defining one or more slots that extend from the innermost surface to the outer surface;
   an outer body at least partially surrounding the inner body and rotatable about an axis of rotation;
   one or more retaining members each defining a retaining surface, the retaining members configured to abut against and exert a clamping force upon the container, wherein each of the one or more retaining members is disposed in the one or more slots of the inner body, and wherein the retaining members are each connected to the inner body by a hinged connection and are configured to actuate about the hinged connection between a first position where the retaining surface is at a maximum distance when measured from the axis of rotation of the outer body and a second position where the retaining surface is measured at a minimum distance when measured from the axis of rotation of the outer body;
   one or more biasing members each connected to the one or more retaining members, wherein each of the one or more biasing members are in contact with the outer surface of the inner body to bias the retaining members away from the second position; and
   one or more camming members disposed around the outer body and corresponding to one of the retaining members, wherein each of the camming members are configured to urge a corresponding retaining member about the hinged connection between the first position and the second position as the outer body rotates about the axis of rotation.

2. The container holder of claim 1, wherein the maximum distance is configured to accommodate a first container and the minimum distance is configured to accommodate a second container, and wherein a diameter of the first container is greater than the diameter of the second container.

3. The container holder of claim 1, wherein each of the retaining members include a follower surface.

4. The container holder of claim 3, wherein each of the camming members define a camming surface configured to contact the follower surface of the corresponding retaining member.

5. The container holder of claim 4, wherein the camming surface is an inclined arcuate surface.

6. The container holder of claim 4, wherein the camming surface defines a first height and a second height, and wherein the camming members are disposed around an inner surface of the outer body.

7. The container holder of claim 6, wherein the first height represents a maximum distance between the camming surface and the inner surface of the outer body and the second height represents a minimum distance between the camming surface and an inner surface of the outer body.

8. The container holder of claim 1, wherein each biasing member is configured to exert a biasing force against the outer surface of the inner body.

9. The container holder of claim 1, wherein the container holder is part of a trim component for a vehicle.

10. A container holder, comprising:
    an inner body defining an innermost surface shaped to receive a container and an outer surface opposite the innermost surface, the inner body defining one or more slots that extend from the innermost surface to the outer surface;
    an outer body at least partially surrounding the inner body and rotatable about an axis of rotation;
    one or more retaining members each defining a retaining surface configured to abut against and exert a clamping force upon the container, wherein each of the one or more retaining members is disposed in the one or more slots of the inner body, and wherein the retaining members are each connected to the inner body by a hinged connection and are configured to actuate about the hinged connection between a first position where the retaining surface is at a maximum distance when measured from the axis of rotation of the outer body and a second position where the retaining surface is measured at a minimum distance when measured from the axis of rotation of the outer body;
    one or more biasing members that each exert a biasing force against the outer surface of the inner body, wherein the biasing members are connected to one of the retaining members; and
    one or more camming members disposed around the outer body and corresponding to one of the retaining members, wherein each of the camming members extend from the outer body and are configured to urge a corresponding retaining member about the hinged connection between the first position and the second position as the outer body rotates about the axis of rotation.

11. The container holder of claim 10, wherein the maximum distance is configured to accommodate a first container and the minimum distance is configured to accommodate a second container, and wherein a diameter of the first container is greater than the diameter of the second container.

12. The container holder of claim 10, wherein each of the retaining members include a retaining surface that contacts the container adjacent the innermost surface of the inner body and a follower surface disposed opposite the retaining surface.

13. The container holder of claim 12, wherein each of the camming members define a camming surface configured to contact the follower surface of the corresponding retaining member.

14. The container holder of claim 13, wherein the camming surface is an inclined arcuate surface.

15. The container holder of claim 12, wherein the camming surface defines a first height and a second height, and wherein the camming members are disposed around an inner surface of the outer body.

16. The container holder of claim 15, wherein the first height represents a maximum distance between the camming surface and the inner surface of the outer body and the second height represents a minimum distance between the camming surface and an inner surface of the outer body.

17. The container holder of claim 10, wherein the container holder is part of a trim component for a vehicle.

18. A container holder for a vehicle, the container holder comprising:
   a trim component, comprising:
      an inner body defining an innermost surface shaped to receive a container and an outer surface opposite the innermost surface, the inner body defining one or more slots that extend from the innermost surface to the outer surface;
      an outer body at least partially surrounding the inner body and rotatable about an axis of rotation;
      one or more retaining members each defining a retaining surface configured to abut against and exert a clamping force upon the container, wherein each of the one or more retaining members is disposed in the one or more slots of the inner body, and wherein the retaining members are each connected to the inner body by a hinged connection and are configured to actuate about the hinged connection between a first position where the retaining surface is at a maximum distance when measured from the axis of rotation of the outer body and a second position where the retaining surface is measured at a minimum distance when measured from the axis of rotation of the outer body;
      one or more biasing members that each exert a biasing force against the outer surface of the inner body, wherein the biasing members are connected to one of the retaining members; and
      one or more camming members disposed around the outer body extending from the outer body and in alignment with the slots and corresponding to one of the retaining members, wherein each of the camming members are configured to urge a corresponding retaining member about the hinged connection between the first position and the second position as the outer body rotates about the axis of rotation.

19. The container holder of claim 18, wherein each of the retaining members include a retaining surface that contacts the container adjacent the innermost surface of the inner body and a follower surface disposed opposite the retaining surface, and wherein the camming members contact the follower surface.

* * * * *